United States Patent
Goldhamer

(10) Patent No.: US 7,177,645 B2
(45) Date of Patent: Feb. 13, 2007

(54) SPECTRUM SHARING BETWEEN WIRELESS SYSTEMS

(75) Inventor: Mariana Goldhamer, Ramat-Gan (IL)

(73) Assignee: Alvarion Ltd., Tel Aviv (IL)

( * ) Notice: Subject to any disclaimer, the term of this patent is extended or adjusted under 35 U.S.C. 154(b) by 79 days.

(21) Appl. No.: 11/076,224

(22) Filed: Mar. 10, 2005

(65) Prior Publication Data

US 2005/0202824 A1    Sep. 15, 2005

(30) Foreign Application Priority Data

Mar. 11, 2004    (IL) .................................... 160832

(51) Int. Cl.
*H04Q 7/20*    (2006.01)
*H04Q 7/28*    (2006.01)

(52) U.S. Cl. ...................... 455/447; 455/448; 455/450; 455/452.1; 455/452.2; 455/454; 370/337; 370/341; 370/330; 370/280; 370/324; 370/468

(58) Field of Classification Search ................ 455/447, 455/448, 450, 452.1, 452.2, 454; 370/337, 370/341, 330, 280, 324, 468
See application file for complete search history.

(56) References Cited

U.S. PATENT DOCUMENTS

| | | | |
|---|---|---|---|
| 5,285,443 A * | 2/1994 | Patsiokas et al. ........... 370/280 |
| 5,420,851 A | 5/1995 | Seshadri et al. | |
| 5,594,720 A | 1/1997 | Papadopoulos et al. | |
| 5,602,836 A | 2/1997 | Papadopoulos et al. | |
| 5,710,797 A | 1/1998 | Segal et al. | |
| 5,835,859 A | 11/1998 | Doner | |
| 6,108,517 A | 8/2000 | Arslan et al. | |
| 6,707,798 B1 | 3/2004 | Klein et al. | |
| 6,956,835 B2 * | 10/2005 | Tong et al. ................. 370/330 |
| 2005/0201368 A1 * | 9/2005 | Periyalwar et al. ......... 370/356 |

FOREIGN PATENT DOCUMENTS

| | | |
|---|---|---|
| EP | 0 720 405 A2 | 7/1996 |
| JP | 2-233029 A | 9/1990 |
| JP | 4-321328 A | 1/1991 |
| JP | 3-283924 A | 12/1991 |

* cited by examiner

*Primary Examiner*—Joseph Feild
*Assistant Examiner*—Julio Perez
(74) *Attorney, Agent, or Firm*—Browdy and Neimark, PLLC

(57) ABSTRACT

In a wireless network, subjected to interferences caused by the operation of an adjacent network, a method and devices are provided to allow the allocation of time-sub-frames for operating at frequencies that are subjected to such interferences.

By the present invention, a time frame allocated for communication is divided into at least two time sub-frames. The links along which communications will be transmitted in each of these sub-frames are selected in such a way that during each sub-frame, none of the operative links will be subjected to interferences caused by communications transmitted during that sub-frame along any of the other links.

Also, the time frames allocated for communication along the channels that experience interferences are divided into at least two time sub-frames. One of the time sub-frames is reserved for communicating signals to/from subscriber terminals that are not subjected to interferences, while another time sub-frame is reserved for communicating radio signals to/from terminals that are subjected to interferences. The transmission and/or reception of radio signals along the interfered channels are scheduled in such a way that the interferences caused by the adjacent wireless network, will not have an impact on transmissions and/or receptions of the radio signals at either end of any link which is subjected to interference.

20 Claims, 5 Drawing Sheets

SPECTRUM SHARING BETWEEN WIRELESS SYSTEMS

FIELD OF THE INVENTION

The present invention relates to digital communications and, in particular, to handling interferences while transmitting and receiving signals in wireless communications systems.

BACKGROUND OF THE INVENTION

As known in the art, a primary consideration in any digital communications system is the channel bandwidth and channel separation required to transmit information. Therefore, digital systems are typically designed to utilize channel bandwidth as efficiently as possible. For example, in systems utilizing frequency division multiplexing, maximum spectral efficiency is obtained by spacing frequency channels very close to one another in an available spectrum.

Minimum carrier spacing is limited in practice, however, by adjacent channel interference. Adjacent channel interference is defined as the interference resulting when carrier frequencies are spaced close enough to one another that information signals received from number of carriers overlap in the frequency spectrum. In practice, the minimum allowable carrier spacing is a function of the bandwidths of the information signals, the practical limitations associated with receiver filtering, and the signal modulation and coding schemes used. Number of design improvement providing increased suppression of adjacent channel interference have been suggested to increase system capacity, relax coding and modulation design requirements, or improve signal quality.

In conventional systems, adjacent channel interference is suppressed in a number of ways. For example, in certain cellular radio systems, adjacent channel interference is avoided through channel allocation schemes in which channels immediately adjacent to one another in frequency are assigned to different spacial cells. Consequently, physical separation reduces mutual interference between adjacent channels. In other communications systems (e.g., satellite and land mobile radio systems), however, suppression of adjacent channel interference by physical separation of adjacent channels may not be possible.

By an alternative conventional approach, during demodulation of a given carrier signal, a bandpass filter centered at an adjacent carrier is used to extract an adjacent channel signal (ACS) at the adjacent carrier. The extracted signal is then used to estimate the adjacent channel signal envelope and carrier and to coherently detect the adjacent channel signal. The detected adjacent channel signal is then waveform shaped, and the estimated adjacent channel carrier and envelope are impressed on the resulting signal. Ideally, the described process provides a reconstructed adjacent channel signal at its carrier frequency. The reconstructed signal can then be passed through a bandpass filter centered at the carrier of interest and subtracted from the received signal to remove the adjacent channel interference.

Such an approach has several limitations, however. For example, analog signal processing using filters and mixers adds undesirable cost and size to a radio receiver, and since the analog components vary with the manufacturing process, such receivers provide a relatively unpredictable range of performance. Additionally, subtracting a signal at radio frequency requires highly accurate carrier reconstruction and time alignment, as an error as small as half a cycle at radio frequency can cause the adjacent channel signal to double rather than diminish. Furthermore, such use of the adjacent channel carrier (phase and frequency) and envelope (amplitude) implicitly assumes that the radio channels are not dispersive. However, in many practical wireless systems (e.g., D-AMPS and GSM), the symbol rate is sufficiently high that the radio transmission medium must be modeled to include time dispersion which gives rise to signal echoes. Thus, the proposed technique is not always practical for use in many present day applications.

According to another conventional approach, demodulation parameters such as linear or decision feedback equalization filter coefficients are adapted to minimize noise and adjacent channel interference together. Alternatively, spectrally efficient continuous phase modulation (CPM) techniques can be used to reduce the effects of adjacent channel interference.

U.S. Pat. No. 6,108,517 discloses methods and apparatus for receiving adjacent channel signals wherein adjacent channel interference effects are minimized through joint demodulation of the adjacent channel signals. A channel associated with each signal and each corresponding frequency band is estimated and used to form joint branch metrics for joint sequence estimation. Thus, a baseband processor receives baseband samples corresponding to a certain carrier frequency, and then jointly demodulates at least two information streams corresponding to different carrier frequencies in dependence upon the received baseband samples.

U.S. Pat. No. 5,710,797 describes a single transducer digital communication receiver which is capable of extracting the data bits of at least one desired signal in the presence of interfering signals of similar type, so as to provide a system in which overlapping transmissions are tolerated and allowed. This publication describes a specific frequency plan, which includes an appropriate digital demodulator that extracts the data bits of the desired signal(s) in the presence of closely spaced signals. The disclosure enables reduced channel spacing in digital communication systems and thereby increases the system capacity (i.e. the number of users per bandwidth unit) without incurring any significant loss in system performance (e.g. power margins, BER, and channel availability). It also allows a reduced power margin that is required to maintain a pre-specified performance level without sacrificing system capacity.

The disclosure of the references mentioned herein throughout the present specification are hereby incorporated by reference.

As noted above, however, minimizing or avoiding adjacent channel interference using the above described systems provides relatively minor improvement with respect to spectral efficiency, and current suppression mechanisms are inadequate for broad applications. Thus, there is a need for improved methods and apparatus for significantly reducing the impact of adjacent channel interference.

SUMMARY OF THE INVENTION

It is an object of the present invention to provide a method and apparatus to minimize interferences created when a number of systems are using the same or adjacent frequency channels.

It is another object of the present invention to provide a method and an apparatus to ensure a pre-determined required quality of service in unlicensed band wireless networks or in not-coordinated deployment in licensed bands wireless networks.

Other objects of the invention will become apparent as the description of the invention proceeds.

In accordance with a first embodiment of the invention, there is provided in a wireless system comprising a first plurality of wireless networks, each wireless network comprising at least one base station and at least one subscriber terminal associated therewith, wherein at least one of the communication links extending between at least one of a first plurality of base stations and one or more subscriber terminals adapted to communicate with said at least one base station, experiences interferences resulting from communications exchanged along at least one communication link comprised in a different wireless network, a method of allocating sub-frames within one or more communication time frames for eliminating said interferences. The method comprises:

for each wireless network, classifying each of the operative links extending between the base station of that network and the subscriber terminals associated therewith. The criterion for the classification is the interference to which the link would be subjected due to transmissions of communications in at least one other wireless network;

allocating within one or more of the communication time frames designated for transmission and/or reception of communications along the first plurality of wireless networks, at least two sub-frames;

determining which of the links will be allowed to carry communications during each one of the at least two sub-frames, wherein the determination is made to satisfy a selection condition whereby none of the links associated with a certain sub-frame should be subjected to interferences caused by communications transmitted along any of the other links carrying communications during that sub-frame; and communicating radio signals between each of the base stations and their respective one or more subscriber terminals during the at least two sub-frames, wherein the communication is carried in accordance with the determination step.

According to another embodiment of the invention, in case that in the determining step, one or more of the links cannot be is associated with any of the at least two sub-frames because of failing to satisfy that selection condition (in other words, there is no sub-frame where that one or more link will not be subjected to interference), at least one of the links that would cause interferences in communications along that one or more links, will not be transmitting any communications during that sub-frame.

By yet another embodiment of the invention, at least one of the sub-frames is selected to allow transmission of communications along links operative in at least two different wireless networks out of the first plurality of wireless networks, and wherein each of said links is not subjected to any interferences caused by any of the other links along which communication is transmitted in the first plurality of wireless networks. Preferably, communications could be conveyed along all links which belong to the group that comprises most or all of the links that are not subjected to interference caused by any other member (link) of that group, during that at least one sub-frame.

By still another embodiment of the invention, the method is further characterized in that at least one base station selected from among said first plurality of base stations is provided with an option to change one or more of its operating parameters while communicating with its associated one or more subscriber terminals within at least one sub-frame selected from among the at least two sub-frames, and wherein at least one member of the group comprising the remaining base stations and the plurality of subscriber terminals associated with these remaining base stations, is adapted to respectively change its operating parameters in order to ensure that no interferences are experienced along the communication link extending between that one base station and the one or more subscriber terminals communicating therewith, for the duration of said at least one sub-frame. In addition or in the alternative, the method is further characterized in that at least one subscriber terminal selected from among a plurality of subscriber terminals associated with the first plurality of base stations, is provided with an option to change one or more of its operating parameters while communicating with its associated base station within at least one sub-frame selected from among the at least two sub-frames, and wherein at least one member of the group comprising the remaining base stations out of the first plurality of base stations and the plurality of subscriber terminals associated with these remaining base stations, is adapted to respectively change its operating parameters in order to ensure that no interferences are experienced along the communication link extending between that one subscriber terminal and the base station it communicates with, for the duration of said at least one sub-frame.

Preferably, the one or more operating parameters is selected from the group comprising transmission power, beam shape, bandwidth fraction, modulation, coding rate, any combination thereof, and the like.

In accordance with another preferred embodiment of the present invention, the allocation of the sub-frames (the at least two sub-frames) is made in accordance with a repetitive pattern or scheme which is repeated every N consecutive time frames (where N being an integer), and wherein the repetitive pattern or scheme may vary from time to time, e.g. following the receipt of certain message(s), etc.

By yet another embodiment of the invention, a second plurality of base stations is selected from among the first plurality of base stations, and wherein each of the second plurality of base stations is provided with an option to change one or more of its operating parameters while communicating with its respective one or more subscriber terminals within at least one sub-frame, provided that no interferences to communications transmitted and/or received by any of the second plurality of base stations, is caused by communications transmitted and/or received by any other base station out of the second plurality of base stations.

According to yet another embodiment of the invention, the method further comprising a step of incorporating at least one marking signal or at least one marking message designated for a recipient that is comprised in at least one other of the first plurality of wireless networks (e.g. a base station, one or more subscriber terminal(s)), indicating at least one of the following: a beginning of a time frame, a beginning of one or more sub-frames, end of a time frame, end of one or more sub-frames, duration of time frame, duration of a one or more sub-frames, any combination thereof, and the like.

According to still another embodiment of the invention, the method further comprising a step of transmitting at least one request signal or at least one request message in order to request a change in at least one of the following: the duration of at least one time sub-frame during which communications may be transmitted and/or received along at least one other link belonging to another wireless network of the first plurality of wireless networks, and/or request to change one or more operating parameters characterizing transmission and/or reception along at least one other link belonging to another wireless network out of the first plurality of wireless networks.

Preferably, the at least one request signal or the at least one request message is generated based on a load of traffic to be transmitted by one or more base stations and/or by one or more subscriber terminals, or is generated based on the level of interference thereat.

In accordance with still another embodiment of the invention, the step of incorporating at least one marking signal or at least one marking message in a signal to be transmitted, is carried by transmitting at least one energy-carrying signal in at least one pre-defined sub-band of the signal transmitted.

According to yet another embodiment of the invention, the step of transmitting at least one request signal or at least one request message is carried by transmitting at least one energy-carrying signal in at least one pre-defined sub-band of the signal transmitted.

By yet another aspect of the invention, there is provided a base station adapted to operate in a wireless network and comprising:

an interface operative to allow communication between this base station and a plurality of subscriber terminals associated therewith;

at least one radio transceiver operative at at least one frequency and capable of transmitting communication traffic towards the plurality of subscriber terminals and receive communication traffic therefrom;

at least one processor adapted to:

determine existence of interferences caused by communications transmitted between at least one other base station and at least one other subscriber terminal at substantially the same or substantially adjacent frequency to the frequency used for communication between this base station and one or more subscriber terminals out of the plurality of subscriber terminals;

divide at least one of the time frames allocated for transmission and/or reception of communications, into at least two time sub-frames, wherein each of the at least two sub-frames is characterized in that all of the links along which communication is being transmitted during the sub-frame are not subjected to interferences caused by any of the at least one other base station or the at least one other subscriber terminal, during that sub-frame.

According to an embodiment of this aspect of the invention, the at least one processor is further adapted to incorporate at least one marking signal or at least one marking message in a signal to be transmitted, indicating at least one of the following: a beginning of a time frame, a beginning of one or more sub-frames, end of a time frame, end of one or more sub-frames, duration of time frame, duration of a one or more sub-frames, any combination thereof, and the like.

By yet another embodiment of this aspect of the invention, the at least one processor is further adapted to associate at least one request signal or at least one request message with a signal to be transmitted, in order to request changing of at least one of the following: the duration of at least one time sub-frame during which communications may be transmitted and/or received along at least one other link belonging to another wireless network, and/or to change one or more operating parameters characterizing the transmission and/or reception along at least one other link belonging to another wireless network.

According to still another aspect of the invention, there is provided a subscriber terminal adapted to operate in a wireless network and comprising:

an interface operative to allow communication between this subscriber terminal and at least one base station;

at least one radio transceiver operative at at least one frequency and adapted to transmit communication traffic towards the at least one base station and receive communication traffic therefrom;

at least one processor adapted to:

determine existence of interferences caused by radio transmissions at a frequency that is substantially the same or substantially adjacent to a frequency used by this subscriber terminal, occurring during transmission to or reception of communication from the at least one base station; and notifying the at least one base station of the interferences detected; and wherein the at least one radio transceiver is adapted to receive radio transmissions within a time sub-frame allocated by the at least one base station for transmitting radio transmissions to subscriber terminals that experience interferences in their communication with that at least one base station, and wherein the at least one radio transceiver is further adapted to transmit radio transmissions within a time sub-frame allocated by that at least one base station for receiving radio transmissions from subscriber terminals that experience interferences in their communication with the at least one base station.

According to an embodiment of this aspect of the invention, the at least one processor is further adapted to receive and/or incorporate in a signal to be transmitted, at least one marking signal or at least one marking message indicating at least one of the following: a beginning of a time frame, a beginning of one or more sub-frames, end of a time frame, end of one or more sub-frames, duration of time frame, duration of a one or more sub-frames, any combination thereof, and the like.

By still another embodiment of this aspect of the invention, the at least one processor is further adapted to receive and/or incorporate in a signal to be transmitted at least one request signal or at least one request message, in order to request a change in at least one of the following: the duration of at least one time sub-frame during which communications may be transmitted and/or received along at least one other link belonging to another wireless network, and/or one or more operating parameters characterizing transmission and/or reception along at least one other link belonging to another wireless network.

DETAILED DESCRIPTION OF THE INVENTION

Figure 1A:
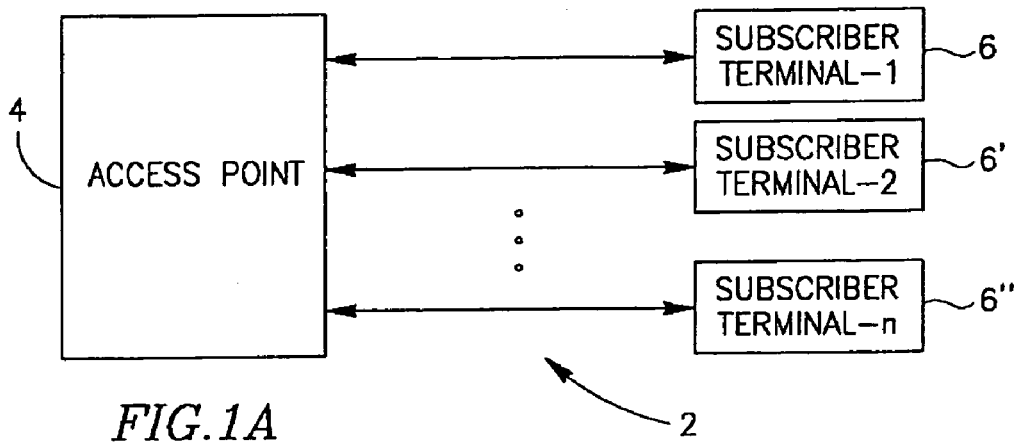
FIG. 1A—presents a schematic illustration of a radio network.

A better understanding of the present invention is obtained when the following non-limiting detailed description is considered in conjunction with the following drawings in which:

FIG. 1A describes a part of radio network constructed in accordance with an embodiment of the present invention. A schematic illustration of that part of the radio network 2 is provided in FIG. 1A which comprises an AP ("access point", e.g. a base station) 4 being in a wireless communication with a number of subscriber terminals, 6, 6' and 6".

Figure 1B:
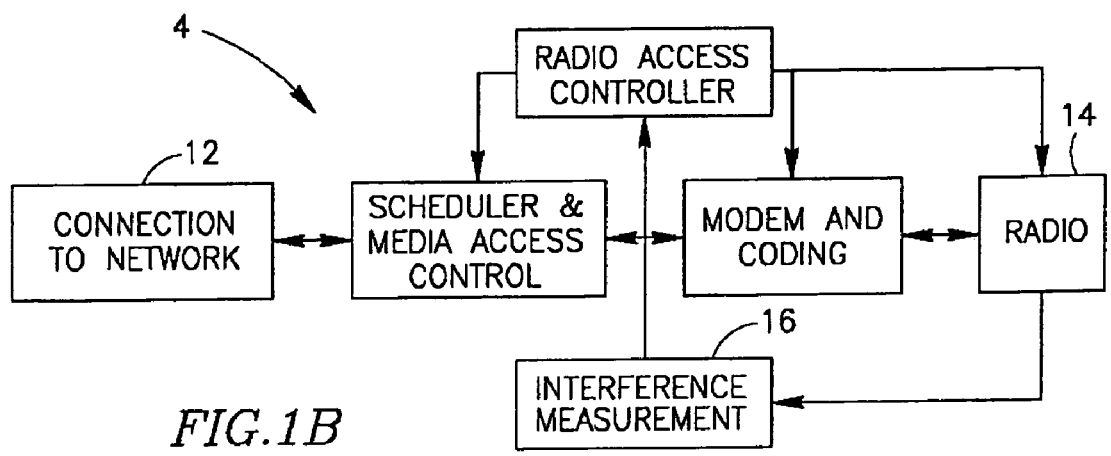
FIG. 1B—presents a schematic illustration of an Access Point in accordance with the present invention.
Figure 1C:
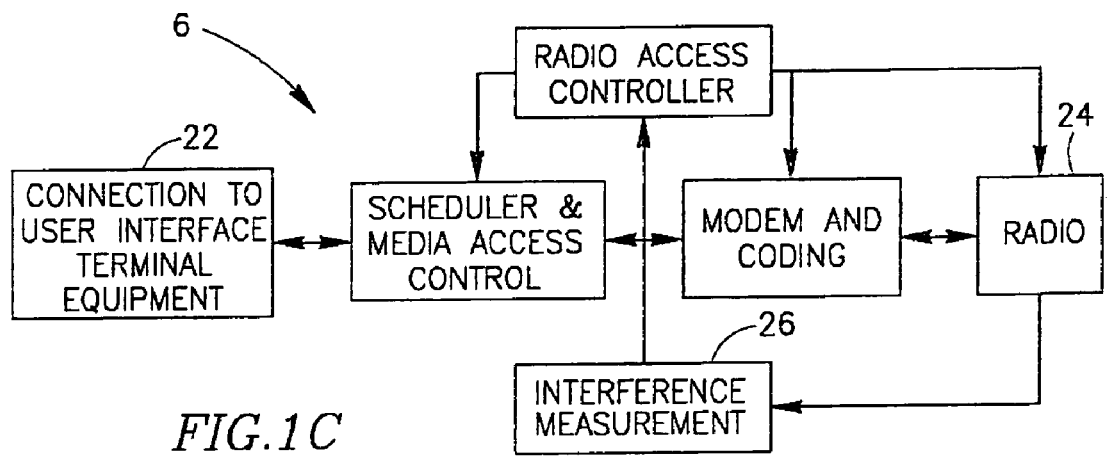
FIG. 1C—presents a schematic illustration of a subscriber terminal in accordance with the present invention.

FIG. 1B illustrates an exploded view of access point 4, which comprises in this present example, among others, an interface 12 operative to allow the connectivity of access point 4 to the feeding transmission network, and radio transceiver 14 which allows transmitting and receiving radio transmissions from each of the subscriber terminals connected to this access point. Access point 4 further comprises a processor 16 operative to measure and evaluate the interferences in the transmission received resulting from any one of a number of reasons, such as a subscriber terminal is too close to another base station wherein a channel at an adjacent frequency is used, a subscriber terminal is located at the proximity of the edge of the relevant cell, and the same channel frequency is used at the neighboring cell, etc. Similarly, a subscriber terminal, (6 as shown in FIG. 1C) comprises an interface 22 operative to allow its connection to the user equipment and/or to the terminal equipment, a radio transceiver 24 which is operative to transmit and receive radio transmissions to and from access point 4, and processor 26 operative to measure and evaluate the interferences in the radio transmissions received.

As explained above, there could be a number of reasons why such interferences occur. Some examples of layouts which may lead to the creation of such interferences are illustrated in FIGS. 2A and 2B.

Figure 2A:
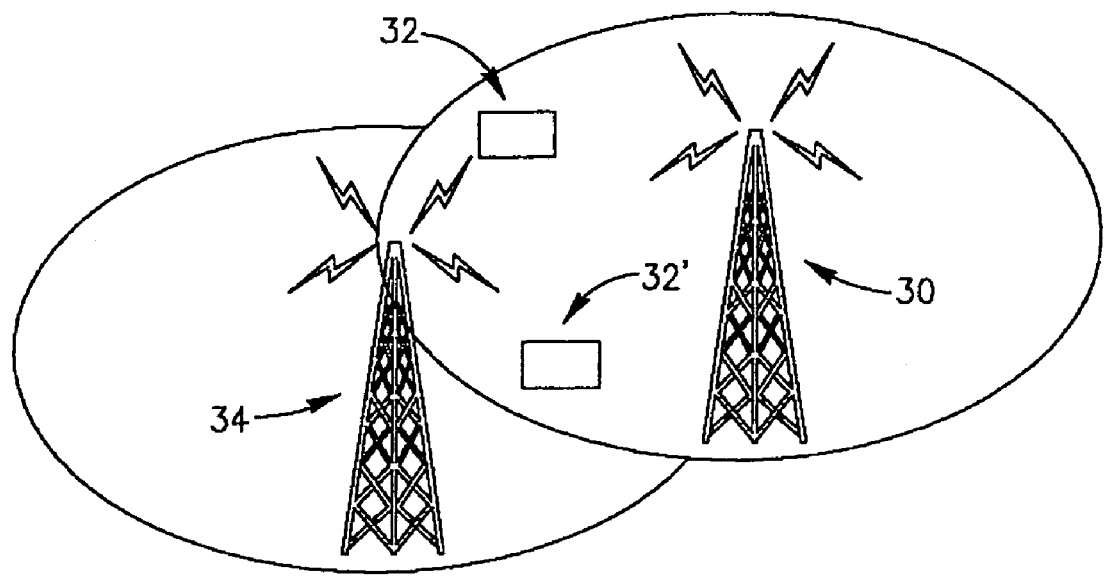
FIG. 2A—illustrates a two radio networks setup, overlaid and not co-located wherein interference problems are solved in accordance with the present invention.

FIG. 2A illustrates two base stations 30 and 34, each belonging to a different radio network, where they are overlaid and not co-located. Subscriber terminals 32 and 32', which belong to the network serviced by base station 30 are located close to base station 34, and therefore might be affected by the transmission to and from that base station, when the transmissions are at frequencies adjacent to those used by terminals 32 and 32', respectively.

Figure 2B:
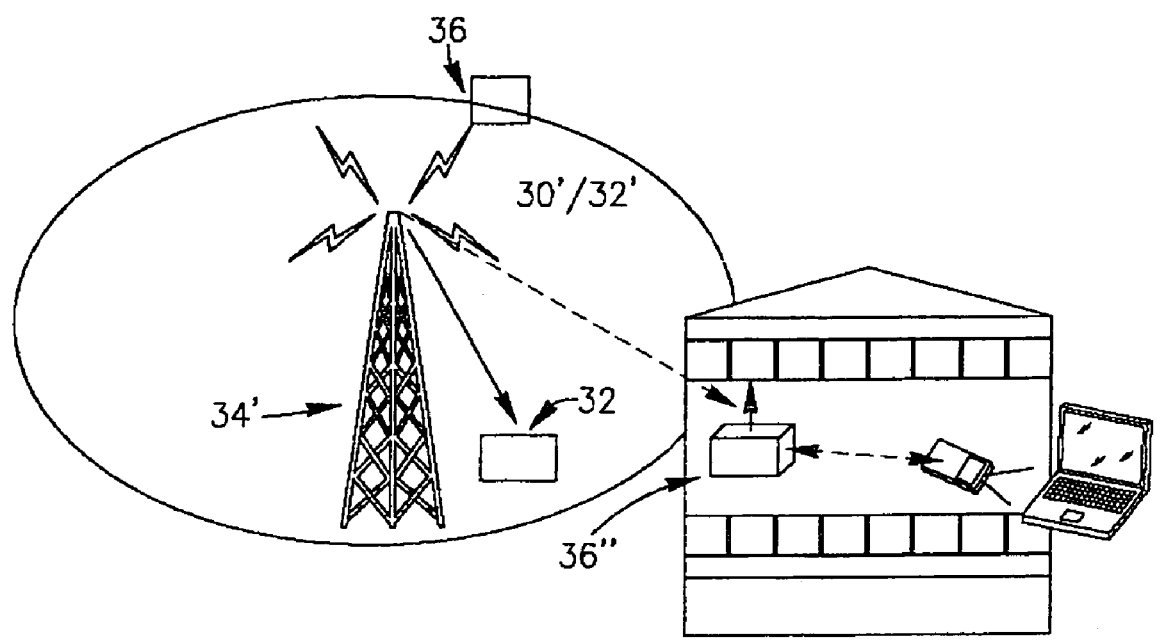
FIG. 2B—illustrates a three radio networks partially overlaid with indoor interferences, wherein interference problems are solved in accordance with the present invention.

FIG. 2B presents a schematic illustration of a somewhat more complicated scenario of three radio networks partially overlaid. In addition to the base stations and terminals shown in FIG. 2A, there are also terminals 36 and 36' connected to base station 34', and a wireless Local Access Network (LAN) 36".

In order to overcome such interferences by one of the embodiments of the present invention, let us consider an example of a base station that operates in a 3 time frames cycles (referred to as "MAC" Frames—Media Access Control Frames), where each such time frame comprises a time interval (DL Tx) for it to transmit downlink (i.e. towards the subscribers) and a time interval (Rx) for receiving the subscribers' transmissions. According to the present invention embodiment demonstrated in FIG. 3, each the two time intervals DL Tx and Rx is further divided into two time sub-frames. Let us now consider the first frame in the cycle where DL Tx is divided into two time sub-frames. In the first one, for the duration designated as B1, the base station will transmit to those subscribers' terminals operating at frequency F3 and which do not experience interferences from others. In the other time sub-frame, designated as C, the base station will transmit to those subscribers' terminals operating at frequency F3 but which do experience interferences from others. The underlying idea of this embodiment of the invention is that during time slot C there will be no interferences from others for the reasons that will be explained further on. Similarly, the Rx interval of that first frame, is divided into two time sub-frames. In the first one, for the duration designated as E1, the base station will receive transmissions from the subscribers' terminals operating at frequency F3 and which do not experience interferences from others. In the other time sub-frame, designated as F, the base station will receive transmissions from those subscribers' terminals operating at frequency F3 but which do experience interferences from others. Thus, when interferences are detected at a subscriber's terminal, it will initiate a process whereby an appropriate slot be found within time sub-frame F during which it will transmit its radio transmission towards the base station with no interferences.

However, as can be appreciated by those skilled in the art, it would be rather impractical to use time sub-frames having a fixed length, and it would be highly preferred to have them varying so as to cater to the instantaneous needs arising, e.g. traffic loads at the downlink or uplink directions, overall traffic to and from the terminals experiencing interferences, etc.

According to an embodiment of the invention, in order to achieve adaptation to time varying traffic loads, the length of one or more of the time sub-frames at each of the adjacent frequency channels is controlled. Consequently, in case where there are quite a few subscribers' terminals that suffer from such co-channel and/or adjacent channel(s) interferences, the time sub-frame at one or both of the adjacent channels where the base stations transmit at F2 and/or F4 to channels that experience no interference shall be shortened, so that those terminals that had suffered from interferences shall have an appropriate longer time sub-frame to transmit at.

Figure 3:
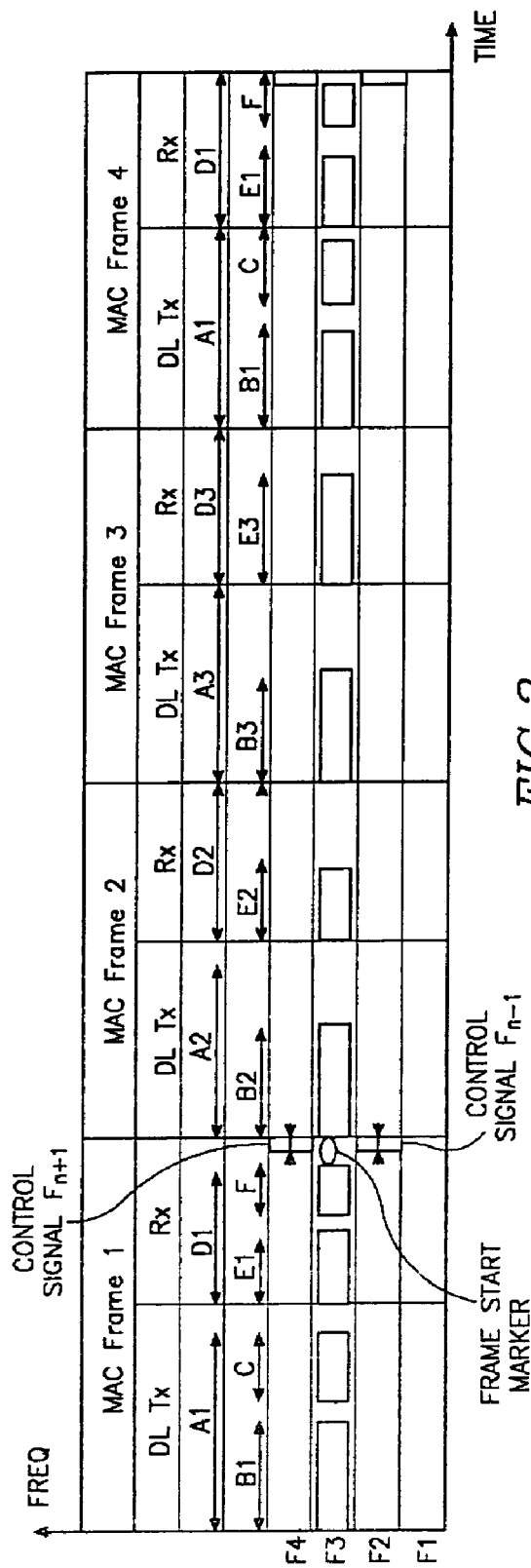
FIG. 3 presents a schematic time domain MAC frames, composed in accordance with the present invention.

As may be seen from FIG. 3, not all of the frames should be handled in the manner described above. In the example shown in this Fig., in frame No. 2 there is only one time sub-frame for the base station to transmit, and one time sub-frame to receive from the terminals associated with the base station, so preferably, the terminals which experience interferences will not transmit to nor receive from the base station any radio transmissions. Similarly, these terminals are not operative in frame 3 (in which there is more time allocated to the terminals transmitting in the uplink direction). In the consecutive frame (No. 4) again there is a division to time sub-frames of frame No. 1 (but possibly at different time lengths). Thus, in every 15 msec (if each of the frames is 5 msec long) cycle, the terminals with the interferences will be operative during one third of the frames. In other words, every three MAC periods, a sub-frame C will be formed, a sub-frame which will not be subjected to interferences as the network operating on F3 has full control over the radio resource in a cyclic mode.

One of the essential conditions to successfully carry out this embodiment of the invention, is that all channels will be synchronized to ensure that all respective time frames of the different channels shall start together, as otherwise there is a very little chance to obtain the desired effect, i.e. that the adjacent channel will stop transmitting when the transmissions are sent to the terminals suffering from interferences. In order to achieve such synchronization, it would be preferred to incorporate an indication marking the beginning of a frame or the end of a frame or both. As would be appreciated by those skilled in the art, such an indication may be either incorporated in each of the frames or only in some of the frames, e.g. a first frame in a cycle or in any other pre-defined period of time.

Figure 4:
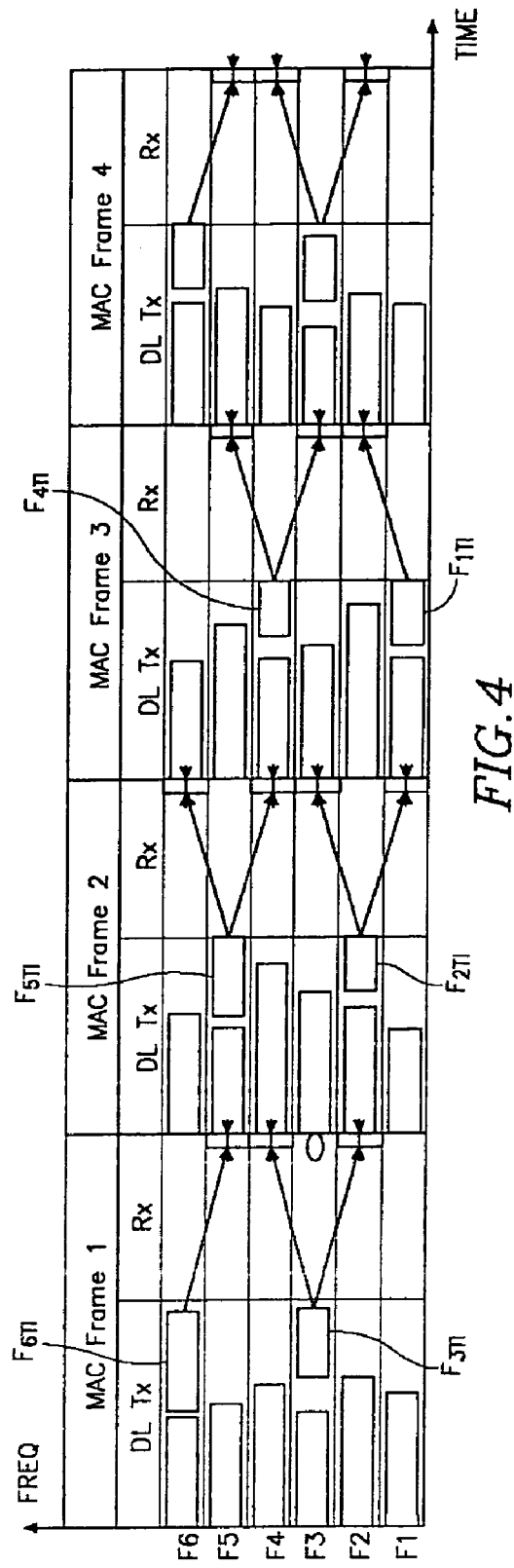
FIG. 4 illustrates a downlink Tx composed to avoid interferences.

Another example is shown in FIG. 4. In this example, again there is a 4 frames cycle, but in this example 6 channels F1 to F6 are used. During frame 1, both systems operating on F3 and F6 will control the length of the time sub-frames of their adjacent channels. F3 will send control signals to affect the duration of F2 and F4 time sub-frames, while F6 will send control signals to affect the length of F5 time sub-frames. In this way, all the terminals which communicate with the base station using channels at F3 or F6 frequency and are effected by interferences will have a time sub-frame within frame 1 to receive transmissions without interferences ($F_{3TT}$ and $F_{6TT}$, respectively) and to transmit without interferences ($F_{3RI}$) if required.

At shown in this example, at the second time frame, a similar process is carried out, but with the difference that the control of the length of the time sub-frames of their adjacent channels is now made by channels F2 and F5. F2 will control the duration of F1 and F3 time sub-frames, while F5 will control the length of F4 and F6 time sub-frames. In this way, all the terminals which communicate with the base station using channels at F2 or F5 frequency and are effected by interferences will have a time sub-frame within frame 2 to receive transmissions without interferences ($F_{2TT}$ and $F_{5TT}$, respectively) and to transmit without interferences if required (not in this example).

Moving on to frame 3, a similar situation is illustrated wherein the control of the length of the time sub-frames of their adjacent channels is now made by channels F1 and F4. F1 will control the duration of F2 time sub-frames, while F4 will control the length of F3 and F5 time sub-frames. In this way, all the terminals which communicate with the base station using channels at F1 or F4 frequency and are effected by interferences will have a time sub-frame within frame 2 to receive transmissions without interferences ($F_{1TT}$ and $F_{4TT}$, respectively) and to transmit without interferences if required (not in this example). When this time frame is completed, the 3 frames cycle illustrated in FIG. 4 is completed and frame 4 presented, is in fact a repetition of frame 1 of the next frame. Every system has the opportunity to communicate in an interference-free mode during one MAC frame out of this cycle. Alternatively, a 4 frames cycle could be decided upon. In this case frames 1 and 4 are used as shown in this Fig. and such a cycle could be used for example when there is a higher traffic load that is associated with terminals that transmit and received in the F3 and F6 channels.

In the above examples, the illustrated cycle's MAC frames are of equal length (duration). However, as will be appreciated by those skilled in the art, there could be a number of allowed MAC frame durations. Preferably, the actual value (or any other suitable division policy) will be decided by operators of the neighboring base stations, who will co-ordinate this parameter between themselves.

As was explained above, in order to achieve the required results, the activities along the various channels to and by the neighboring operators should be synchronized. For example, a MAC frame may start synchronization by using a GPS marking signal, at the beginning of the Tx activity. In order to notify what kind of sync is used, the base station will, at regular intervals, insert SYNC_MARKING SIGNALS before the frame start. In this example, The access point (base station in our example) using GPS for sync will insert SYNC_MARKING SIGNALS type 1;

The AP (Access Point) that synchronize its frame after another AP will insert SYNC_MARKING SIGNALS type 2;

The AP free-running will insert SYNC_MARKING SIGNALS type 3; and

More than one SYNC_MARKING SIGNAL shall be available, in order to differentiate between Access Points using the same frequency.

The division of the time slot between Tx/Rx may be:

Programmed by operators, after co-ordination, and changed only by the appropriate management system; and/or Dynamically changed.

As was previously explained, it is highly desired to achieve a good spectrum utilization efficiency to use channels at adjacent frequencies (which cause the problems that the present invention seeks to solve). For optimal sharing, a limited number of channel widths shall be defined. In addition, a guard channel may be needed, particularly when having different channel spacing between systems occupying adjacent spectrum.

Typically, a cycle of N MAC frames is defined. N may be equal to 3, but if the interference level is high, N preferably equal to 4 or higher, should be used.

In an example where there is only one adjacent channel associated with another system, and no co-channel interferences are experienced, N=1 could suffice.

In order to summarize the above, the following slots were defined in FIG. 3 for a system using a channel at Fe frequency, using a rotating wheel period of 3 MAC frames:

3 intervals A1, A2, A3, each lasting for the DL MAC frame duration;

3 sub-frames B1, B2, B3, each lasting for a duration of the transmissions which do not experience interferences. The duration of slots B1, B2, B3 may be limited to a minimum value;

1 sub-frame C, defined during A1 MAC Frame, and starting after B1, when no adjacent channel, which introduces interference, is operating;

In each of the slots, when using IEEE 802.16 MAC protocol, the corresponding down-link and up-link MAP, scheduling the traffic, will be transmitted (same principle as used for AAS—Advanced Antenna Systems);

In every slot, the transmission may be carried out while using a different level of power;

The SYNC_MARKING SIGNAL, defined above, is transmitted in the MAC Frame containing the sub-frame C.

The designations of the various time slots defined above in connection with FIG. 3 will be used hereinafter for the description of the rest of the figures, and unless specified otherwise, will have the same meaning, mutates mutandis, of those referred to in connection with FIG. 3.

Down-Link Adjacent Channel Interference

As explained above, FIG. 4 presents a preferred way of handling adjacent channel interferences.

A neighborhood AP, that hears in-band other system ST ("Subscriber Terminal") to AU transmission, and NOT working in an adjacent channel to that system, will operate only in the intervals A2, A3. This will leave for the neighborhood system min. 66% of bandwidth. An example is an IEEE 802.11 type AP operating in the near vicinity of an indoor of an IEEE 802.16 type of subscriber terminal. The 802.16 type terminal will request its AP to schedule down-link and up-link transmission only during A1 intervals. In this way, both 802.16 and 801.11 type of systems will be able to work properly, and if required, guarantee pre-defined quality of service.

In the case where the interference is caused by an AP working on a adjacent frequency, there may be a number of subscribers, located in its vicinity, that hear the adjacent channel relatively loud. The AP working on Fn (F3 in the example) has to transmit to these subscribers in a sub-frame, when the other AP is silent. The mechanism provided for sub-frame B1 on $F_n$, B2 on $F_{n+1}$, B3 on $F_{n-1}$ and C, allow to separate the transmission to interference affected users from those not affected and eliminate the adjacent channel interference:

Sub-frame C is used for ST affected by interference

The transmission duration on adjacent frequencies can be controlled by the system e.g. by controlling the transmission duration of the systems working on adjacent frequencies during B1; for the other MAC frames, the system will schedule transmission only to subscriber terminals not affected by interference.

The actual control procedure can preferably take one of the two following forms:

The AU using the sub-frame C, hops on the adjacent channel frequency and sends one signal requesting for lower transmission time or another signal allowing for higher transmission time (these signals are noted "⇋" in FIG. 4).

The AU instructs an ST to send the appropriate control signal in the reserved slot.

If communication is done between inter-operable systems, MAC messages may be used.

Preferably, for every MAC frame, there will be an operators' agreed limit on the minimum time guaranteed for transmission on B1, B2, B3 sub-frames, for every frequency. For example, if this time is 50% of a down-link frame, a system will be able to use (50%+50%+100%)/3=67% of the time resource. The operation without interference could be limited to 50%/3=17%.

Down-Link Co-Channel Interference

Even in FDD or TDD, with synchronized Tx/Rx periods, there could be BS to ST (Subscriber Terminal) co-channel interference, when two operators use the same frequency in adjacent geographical areas.

A BS operator may decide to use only half of the slot C, and leave to the other base station the other half; based on radio measurements the other AU will detect the interference free sub-frame.

Figure 5:
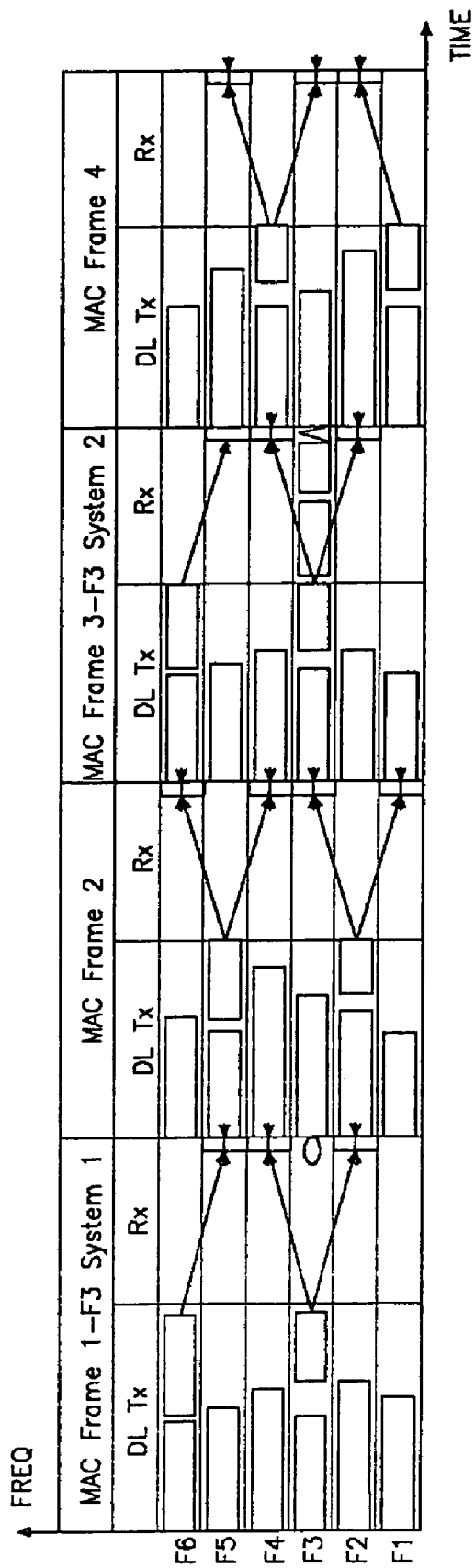
FIG. 5 exemplifies a downlink Tx arrangement for number of frames N=4, which experiences strong co-channel interferences.

Through operators' coordination process, an agreement may be reached for using N=4 and to distribute the use of MAC Frames between the operators. The new MAC frame arrangement is shown in FIG. 5. The SYNC_MARKING SIGNAL will be inserted only by one of the systems working on the same frequency.

The co-channel interference can be controlled for example in MAC Frame 3, system 2 may insert signals at F3 to be decoded by system 1. System 1 may also control system 3 in frames where the synchronization marking signal is not inserted.

Up-Link Adjacent Channel Interference

Figure 6:
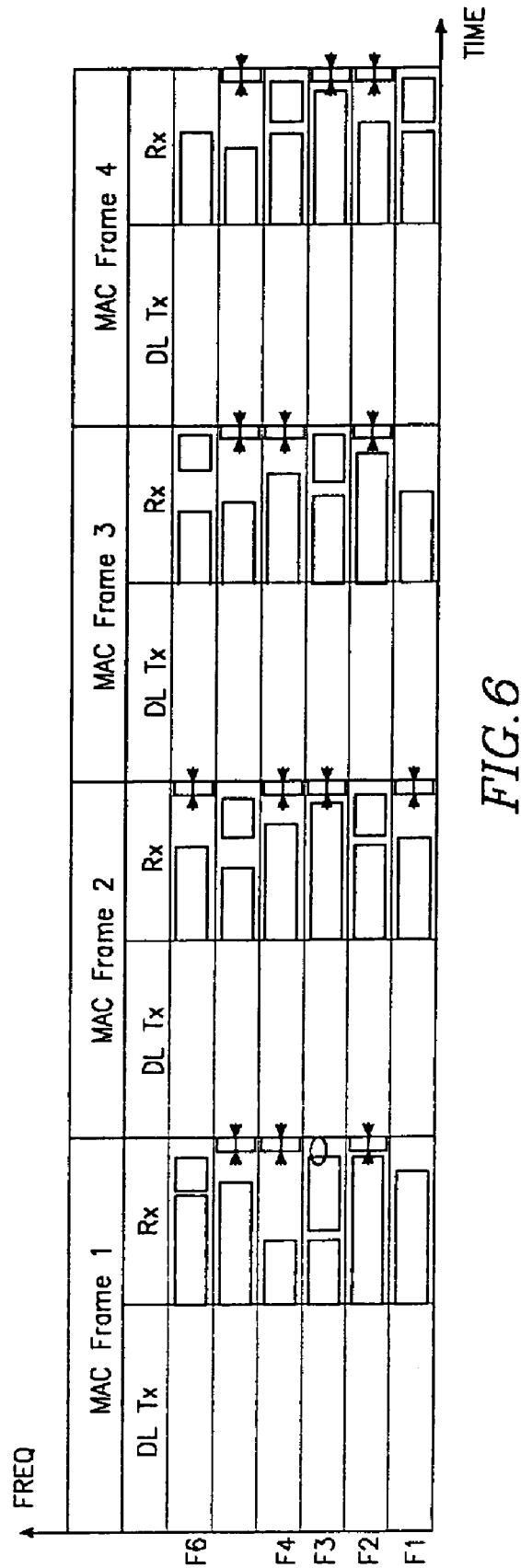
FIG. 6 illustrates an uplink Tx example arrangement for N=3.

The up-link interference is determined by temporary transmission of STs belonging to the other systems, and located in the AP vicinity or transmitting with high power. FIG. 6 illustrates an example of an arrangement wherein N=3.

Next, two possible interference avoidance scenarios will be exemplified:

By the first scenario, a voluntary up-link transmission policy is established, in which interfering stations' transmissions will be scheduled in a way that will not affect the AP up-link traffic.

The neighbor APs should schedule the transmission of those STs in Rx sub-frames, in which the victim AP will not schedule receive activity. Lets use FIG. 2A for discussion. The station 32 is located in the vicinity of AP 34, being interfered by 34 and also causing interference thereat. AP 30, with which ST 32 is associated, is aware of the situation, and shall schedule the transmission of 32 in a sub-frame in which AP 30 does not expect receiving traffic.

By the second scenario, interference-free receive sub-frames (sub-frame F in FIG. 6) will be established. No traffic will be allowed on the up-link adjacent channels, during these sub-frames.

The AP will have control on the duration of transmission, for the adjacent frequencies, using the same signaling procedure as for down-link, in the same MAC frame. Power control may be additionally used.

Uplink Co-Channel Interference

A BS may decide to use only half of the sub-frame F, and leave to the other base station the other half; based on radio measurements the other AU will detect the interference free sub-frame. Through operators' co-ordination process, the operators may agree between themselves on using N=4 and distribute the use of MAC Frames.

Signaling Procedure

Signaling procedures may use MAC messages, FYI signaling or a combination of both.

MAC Messages can provide information between inter-operable systems or can carry higher levels (IP) information, to be used in conjunction with network management systems;

PHY ("Physical Layer") only signals, carrying same information as MAC messages, will preferably be designed such that they:

are tolerant to combining over the air, when coming from different sources; and have more general applicability, by not being technology specific.

Message content:

For interference control, there are 8 messages:

Restrain downlink transmission, use TIME_STEP_1

Restrain downlink transmission, use TIME_STEP_2

Restrain up-link transmission, use TIME_STEP_1

Restrain up-link transmission, use TIME_STEP_2

Increase downlink transmission, use TIME_STEP_1
Increase downlink transmission, use TIME_STEP_2
Increase up-link transmission, use TIME_STEP_1
Increase up-link transmission, use TIME_STEP_2

TIME_STEP_1 may be 2% of MAC Frame duration, and TIME_STEP_2 may be 5% of the MAC Frame duration. STEP_2 may be necessary when a user transmitting during "interference free" sub-frame has much data to transmit.

PHY signaling
  Timing:
    Signal to be send at the end of MAC FRAME
    Signal duration: 1 symbol time, when using OFDM256 FFT
  PHY signaling, using a multi-carrier scheme, may be used.
  Transmission is done by inserting energy in message specific bins.
  Reception is based by recognition of energy and decision regarding the transmitted message and its correctness.
  The reception process should be tolerant to power that may be injected due to interference
  Design tolerant to collisions
  Separate down-link and up-link control directions
  Procedure:
    The most narrow channel (for example: between 10 MHz and 20 MHz, the narrowest channel is 10 MHz) is spit into N sub-bands, numbered from 1 to N; an example for N=32 is given in Table 2.

The part of the channel used for signaling shall preferably be selected so that it will be compliant with the spectrum mask of the widest channel (in previous described situation, 20 MHz).

Every message will preferably also include check bins for confirmation purposes.

As shown in Table 1, by dividing the proper signal band region(s) to the right number of bins, (in this example 12) all 8 above defined messages and their respective check bins can be transferred.

TABLE 1

| Bin allocation per sub-band |
| --- |
| Bin Number |

| | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Sub-band Number | 5 | 7 | 9 | 11 | 13 | 15 | 17 | 19 | 21 | 23 | 25 | 27 |

TABLE 2

Example of message coding

| Message | Bin 1 Decrease DL | Bin 2 Decrease UL | Bin 3 Increase DL | Bin 4 Increase UL | Bin 5 STEP1 DL | Bin 6 STEP2 DL | Bin 7 STEP1 UL | Bin 8 STEP2 UL | Bin 9 DL Bin Check D1 | Bin 10 DL Bin Check D0 | Bin 11 UL bin Check D1 | Bin 12 UL bin Check D0 |
| --- | --- | --- | --- | --- | --- | --- | --- | --- | --- | --- | --- | --- |
| Restrain downlink transmission, use TIME_STEP_1 | Y | | | | y | | | | y | | | |
| Restrain downlink transmission, use TIME_STEP_2 | Y | | | | | y | | | | | y | |
| Restrain up-link transmission, use TIME_STEP_1 | | y | | | | | y | | | | y | |
| Restrain up-link transmission, use TIME_STEP_2 | | y | | | | | | y | | | | Y |
| Increase downlink transmission, use TIME_STEP_1 | | | y | | y | | | | y | | | |
| Increase downlink transmission, use TIME_STEP_2 | | | y | | | y | | | | | y | |
| Increase up-link transmission, use TIME_STEP_1 | | | | y | | | y | | | | y | |
| Increase up-link transmission, use TIME_STEP_2 | | | | y | | | | y | | | 1 | 0 |

SYNC-MARKING SIGNAL signals

The SYNC_MARKING SIGNALS group should be selected so that it will allow Access Points operating at the same frequency, to use different signals.

Following Table 3 shows a possible bin allocation for different SYNC_MARKING SIGNALS.

TABLE 3

An example of bin allocation per SYNC_MARKING SIGNALS

| | \multicolumn{10}{c|}{Sub-band number} |
|---|---|---|---|---|---|---|---|---|---|---|
| | 6 | 8 | 10 | 12 | 14 | 18 | 20 | 22 | 24 | 26 |
| SYNC_MARKING SIGNAL Type 1 | Y | | | y | y | | | Y | | |
| | | y | | | y | y | | | | y |
| | Y | | Y | | | y | y | | | |
| SYNC_MARKING SIGNAL Type 2 | | y | | y | | | y | Y | | |
| | | | Y | | y | | | Y | y | |
| | | | | y | | y | | | y | y |
| SYNC_MARKING SIGNAL Type 3 | Y | | | | y | | y | | | y |
| | | y | Y | | | y | | Y | | |
| | | | Y | y | | | y | | y | |

Example: Start-Up Operation

At the first system, the Access Point will start its operation by going through the following steps:

Making "clear channel assessments"

Trying to find a number of "free" consecutive channels, suitable for its operation, adjacent to systems using the same channel spacing as his own Analyzing other systems in the area. If other systems are found, then:

If the Access Point does not have GPS sync., searching for the system having highest sync. status (highest: GPS, medium: free running, lowest: synchronized)

Determining the number of A intervals in the MAC Frame rotating wheel, for example: N=3, N=4, etc.

Determining the intervals of type A1 (SYNC_MARKING SIGNAL)

Calculating, according to channel shift, the relative position of its A1 slot.

For the first installed system in a geographical area, the Subscriber Terminal will start its operation by going through the following steps:

Searching for MAC Frame start and trying to receive the required information regarding the UL MAP in the $B_n$ sub-frames If possible, trying to make the network entry first in E1, E2, E3 sub-frames.

Figure 7:
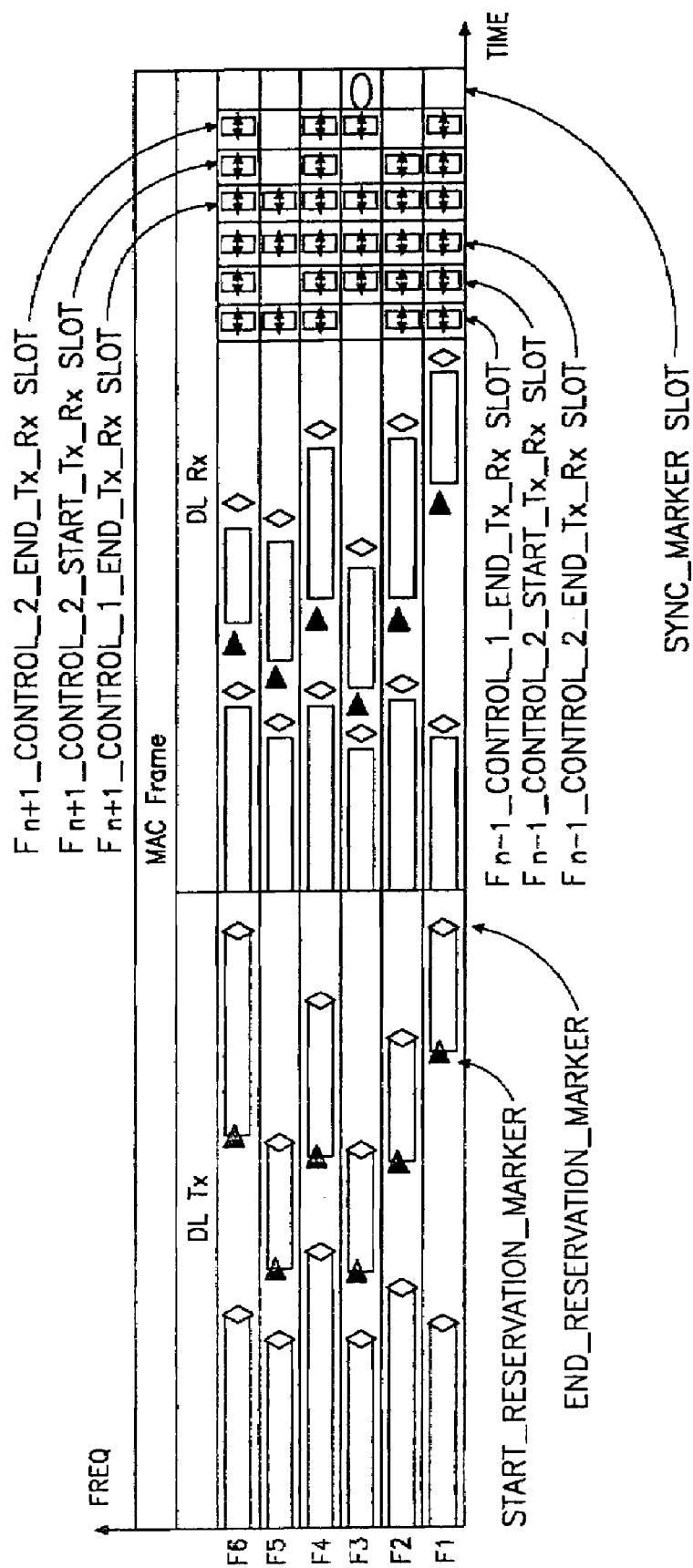
FIG. 7 presents a schematic time domain MAC frame composed in accordance with another embodiment of the present invention.

According to another embodiment of the present invention, a similar process may be carried for each of the MAC Frames, as demonstrated in FIG. 7.

Time Allocation:

i. During the downlink Tx interval a. Each Access Point shall have two different transmission sub-frames. The first transmission sub-frame will start at the beginning of the MAC frame. The point in time for the second transmission sub-frame to start will be selected in a way to avoid overlapping in time with any adjacent channels transmissions. The start of the second transmission sub-frame and the end of both transmission sub-frames shall be marked, in order to allow other Access Points to evaluate the length of the interference-free reservated duration.

ii. During the downlink receive interval:

a. Each Access Point shall have two different reception sub-frames, where the first sub-frame will start at the beginning of the MAC Frame.

b. The Access Point shall use marking signals, indicating the end of both i. Each Access Point will have two different Receive sub-frames, where the first sub-frame shall start at the beginning of the MAC frame;

ii. The Access Point will use marking signals, to mark the end and start of both reservation sub-frames. As will be appreciated by those skilled in the art, a time gap between the marking signals and the actual up-link transmission is likely to occur, due to Rx/Tx transition times.

iii. Before the END_OF_MAC_FRAME, 7 slots are reserved, for:

1. sending periodically and/or occasionally the SYNC_MARKING SIGNAL described before;

2. Sending messages to control the start and the end of Tx and Rx transmission or reception intervals;

a. two messages may be sent with the same PHY signal, as described before;

b. An AP may receive messages from systems working on upper and lower adjacent frequencies; if these messages request contradictory actions, the Access Point will determine the appropriate course of action to be taken.

Signaling procedure a. Same signaling procedure, as described before, may be used.

Co-channel interference

In this case, every AP will try to create different interference-free sub-frames. The number of control slots should be increased by three, to allow the second AP to create its own interference free periods.

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention.

The invention claimed is:

1. In a wireless system comprising a first plurality of wireless networks, each wireless network comprising at least one base station and at least one subscriber terminal associated therewith, wherein at least one of the communication links extending between at least one of a first plurality of base stations and one or more subscriber terminals adapted to communicate with said at least one base station, experiences interferences resulting from communications exchanged along at least one communication link comprised in a different wireless network, a method of allocating sub-frames within one or more communication time frames for eliminating said interferences, which method comprises:

for each wireless network, classifying each of the operative links extending between its base station and the subscriber terminals associated therewith by the interferences to which said link would be subjected due to transmissions of communications in at least one other wireless network;

allocating within one or more of the communication time frames designated for transmission and/or reception of communications along said first plurality of wireless networks, at least two sub-frames;

determining which of the links will be allowed to carry communications during each of said at least two sub-frames, wherein the determination is made to satisfy a selection condition whereby none of the links associated with a certain sub-frame be subjected to interferences caused by communications transmitted along any of the other links carrying communications during that sub-frame; and communicating radio signals between each of the base stations and their respective one or more subscriber terminals during said at least two sub-frames, wherein the communication is carried in accordance with the determination step.

2. A method according to claim 1, wherein in case that in the determining step, one or more of the links cannot be is associated with any of said at least two sub-frames because of failing to satisfy said selection condition, at least one of the links that would cause interferences in communications along said one or more links, will not be transmitting communications during that sub-frame.

3. A method according to claim 1, wherein at least one of said at least two sub-frames is selected to allow transmission of communications along links operative in at least two different wireless networks out of said first plurality of wireless networks, and wherein each of said links is not subjected to any interferences caused by any of the other links along which communication is transmitted in said first plurality of wireless networks.

4. A method according to claim 1, further characterized in that at least one base station selected from among said first plurality of base stations is provided with an option to change one or more of its operating parameters while communicating with its associated one or more subscriber terminals within at least one sub-frame selected from among said at least two sub-frames, and wherein at least one member of the group comprising the remaining base stations and the plurality of subscriber terminals associated with said remaining base stations, is adapted to respectively change its operating parameters in order to ensure that no interferences are experienced along the communication link extending between said one base station and said one or more subscriber terminals communicating therewith, for the duration of said at least one sub-frame.

5. A method according to claim 1, further characterized in that at least one subscriber terminal selected from among a plurality of subscriber terminals associated with said first plurality of base stations, is provided with an option to change one or more of its operating parameters while communicating with its associated base station within at least one sub-frame selected from among said at least two sub-frames, and wherein at least one member of the group comprising the remaining base stations out of said first plurality of base stations and the plurality of subscriber terminals associated with said remaining base stations, is adapted to respectively change its operating parameters in order to ensure that no interferences are experienced along the communication link extending between said at least one subscriber terminal and the base station with which it communicates, for the duration of said at least one sub-frame.

6. A method according to claim 4, and wherein said one or more operating parameters is selected from the group consisting of transmission power, beam shape, bandwidth fraction, modulation, coding rate and any combination thereof.

7. A method according to claim 5, and wherein said one or more operating parameters is selected from the group consisting of transmission power, beam shape, bandwidth fraction, modulation, coding rate and any combination thereof.

8. A method according to claim 1, wherein the allocation of said at least two sub-frames is made in accordance with a repetitive pattern or scheme which is repeated every N consecutive time frames, where N being an integer, and wherein said repetitive pattern or scheme may vary from time to time.

9. A method according to claim 4, wherein a second plurality of base stations is selected from among said first plurality of base stations, and wherein each of said second plurality of base stations is provided with an option to change one or more of its operating parameters while communicating with its respective one or more subscriber terminals within at least one sub-frame, provided that no interferences to communications transmitted and/or received by any of said second plurality of base stations, is caused by communications transmitted and/or received by any other base station out of said second plurality of base stations.

10. A method according to the claim 1, further comprising incorporating at least one marking signal or at least one marking message designated for a recipient that is comprised in at least one other of said first plurality of wireless networks, indicating at least one member of the group consisting of: a beginning of a time frame, a beginning of one or more sub-frames, end of a time frame, end of one or more sub-frames, duration of time frame, duration of a one or more sub-frames, and any combination thereof.

11. A method according to the claim 1, further comprising a step of transmitting at least one request signal or at least one request message in order to request a change in at least one of the following: the duration of at least one time sub-frame during which communications may be transmitted and/or received along at least one other link belonging to another wireless network of said first plurality of wireless networks, and/or one or more operating parameters characterizing transmission and/or reception along at least one other link belonging to another wireless network out of said first plurality of wireless networks.

12. A method according to claim 11, wherein said at least one request signal or said at least one request message is generated based on a load of traffic to be transmitted by one or more base stations and/or by one or more subscriber terminals, or is generated based on the level of interference thereat.

13. A method according to claim 10, wherein said step of incorporating at least one marking signal or at least one marking message is carried by transmitting at least one energy carrying signal in at least one pre-defined sub-band of the signal transmitted.

14. A method according to claim 11, wherein said step of transmitting at least one request signal or at least one request message is carried by transmitting at least one energy carrying signal in at least one pre-defined sub-band of the signal transmitted.

15. A base station adapted to operate in a wireless network and comprising:

an interface operative to allow communication between said base station and plurality of subscriber terminals associated therewith;

at least one radio transceiver operative at at least one frequency and capable of transmitting communication traffic towards said plurality of subscriber terminals and receive communication traffic therefrom;

at least one processor adapted to:
- determine the existence of interferences caused by communications transmitted between at least one other base station and at least one other subscriber terminal, at a frequency substantially the same or substantially adjacent to the frequency used for communication between said base station and one or more subscriber terminals out of said plurality of subscriber terminals;
- divide at least one of the time frames allocated for transmission and/or reception of communications, into at least two time sub-frames, wherein each of said at least two sub-frames is characterized in that all of the links along which communication is being transmitted during said sub-frame are not subjected to interferences caused by any of said at least one other base station or said at least one other subscriber terminal, during that sub-frame.

16. A base station according to claim 15, wherein said at least one processor is further adapted to incorporate at least one marking signal or at least one marking message in a signal to be transmitted, indicating at least one member of the group consisting of: a beginning of a time frame, a beginning of one or more sub-frames, end of a time frame, end of one or more sub-frames, duration of time frame, duration of a one or more sub-frames, and any combination thereof.

17. A base station according to claim 15, wherein said at least one processor is further adapted to associate at least one request signal or at least one request message in a signal to be transmitted, in order to request changing of at least one of the following: the duration of at least one time sub-frame during which communications may be transmitted and/or received along at least one other link belonging to another wireless network, and/or at least one operating parameter characterizing transmission and/or reception along at least one other link belonging to another wireless network.

18. A subscriber terminal adapted to operate in a wireless network and comprising:
- an interface operative to allow communication between said subscriber terminal and at least one base station;
- at least one radio transceiver operative at at least one frequency and adapted to transmit communication traffic towards said at least one base station and receive communication traffic therefrom;
- at least one processor adapted to:
  - determine the existence of interferences caused by radio transmissions at a frequency that is substantially the same or substantially adjacent to a frequency used by said subscriber terminal, and where the interferences occur during transmission to or reception of communication from said at least one base station; and
  - notifying said at least one base station of the interferences detected; and
- wherein said at least one radio transceiver is adapted to receive radio transmissions within a time sub-frame allocated by said at least one base station for transmitting radio transmissions to subscriber terminals that experience interferences in their communication with said at least one base station, and wherein said at least one radio transceiver is further adapted to transmit radio transmissions within a time sub-frame allocated by said at least one base station for receiving radio transmissions from subscriber terminals that experience interferences in their communication with said at least one base station.

19. A subscriber terminal according to claim 18, wherein said at least one processor is further adapted to receive and/or incorporate in a signal to be transmitted, at least one marking signal or at least one marking message indicating at least one member of the group consisting of: a beginning of a time frame, a beginning of one or more sub-frames, end of a time frame, end of one or more sub-frames, duration of time frame, duration of a one or more sub-frames, and any combination thereof.

20. A subscriber terminal according to claim 18, wherein said at least one processor is further adapted to receive and/or incorporate in a signal to be transmitted at least one request signal or at least one request message in order to request changing of at least one of the following: the duration of at least one time sub-frame during which communications may be transmitted and/or received along at least one other link belonging to another wireless network, and/or one or more operating parameters characterizing transmission and/or reception along at least one other link belonging to another wireless network.

* * * * *